(12) United States Patent
Brown et al.

(10) Patent No.: US 8,339,115 B2
(45) Date of Patent: *Dec. 25, 2012

(54) VOLTAGE REGULATOR BYPASS RESISTANCE CONTROL

(75) Inventors: James E. C. Brown, San Jose, CA (US); Bret Rothenberg, Los Altos, CA (US); Lawrence M. Burns, Los Altos, CA (US)

(73) Assignee: R2 Semiconductor, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,572

(22) Filed: Jul. 5, 2012

(65) Prior Publication Data

US 2012/0274297 A1    Nov. 1, 2012

Related U.S. Application Data

(63) Continuation of application No. 12/730,333, filed on Mar. 24, 2010, now Pat. No. 8,248,044.

(51) Int. Cl.
*G05F 1/613* (2006.01)
(52) U.S. Cl. .................. 323/224; 323/284; 323/266
(58) Field of Classification Search .......... 323/224, 323/283, 284, 266
See application file for complete search history.

(56) References Cited

U.S. PATENT DOCUMENTS

| | | | |
|---|---|---|---|
| 4,322,786 A | 3/1982 | Weber | |
| 5,095,261 A * | 3/1992 | Schoofs | 323/222 |
| 5,481,178 A | 1/1996 | Wilcox | |
| 5,745,352 A | 4/1998 | Sandri | |
| 5,905,407 A | 5/1999 | Midya | |
| 5,998,977 A | 12/1999 | Hsu | |
| 6,229,289 B1 | 5/2001 | Piovaccari | |
| 6,396,252 B1 | 5/2002 | Culpepper | |
| 6,472,854 B2 | 10/2002 | Ootani | |
| 6,476,674 B2 | 11/2002 | Smedegaard-Pederson | |
| 6,486,643 B2 | 11/2002 | Liu | |
| 6,583,664 B2 | 6/2003 | Mathe | |
| 6,636,023 B1 | 10/2003 | Amin | |
| 6,661,211 B1 | 12/2003 | Currelly | |
| 6,710,646 B1 | 3/2004 | Kimball | |
| 7,075,280 B2 | 7/2006 | May | |
| 7,190,150 B2 | 3/2007 | Chen | |
| 7,292,015 B2 | 11/2007 | Oswald | |
| 7,342,387 B1 | 3/2008 | Li | |
| 7,679,350 B2 | 3/2010 | Falvey et al. | |

(Continued)

OTHER PUBLICATIONS

Blanken, P., Karadi, R. and Bergveld, H., "A 50 MHz Bandwidth Multi-Mode PA Supply Modulator for GSM, EDGE, and UMTS Application", IEEE RFIC 2008 paper RTU1C-1.

(Continued)

*Primary Examiner* — Shawn Riley
(74) *Attorney, Agent, or Firm* — Brian R. Short

(57) ABSTRACT

Embodiments for at least one method and apparatus of controlling a bypass resistance of a voltage regulator are disclosed. One method includes generating a regulated output voltage based upon a switching voltage. The switching voltage is generated through controlled closing and opening of a series switch element and a shunt switch element, the series switch element and the shunt switch element being connected between voltages based on an input voltage. Control of a duty cycle of the switching voltage is provided by sensing and feeding back the regulated output voltage. The bypass resistance is controlled based on an integration of a difference between the duty cycle and a maximum duty cycle.

19 Claims, 21 Drawing Sheets

U.S. PATENT DOCUMENTS

| | | |
|---|---|---|
| 8,054,058 B2 | 11/2011 | Liu |
| 2006/0006850 A1 | 1/2006 | Inoue et al. |
| 2008/0175025 A1 | 7/2008 | Yoon |
| 2009/0134861 A1 | 5/2009 | Saeki |

OTHER PUBLICATIONS

Wang, F., Kimball, D., Lie, D., P. Asbeck, and Larson, L., "A Monolithic High-Efficiency 2.4-GHz 20-dBm SiGe BiCMOS Envelope-Tracking OFDM Power Amplifier", IEEE J. Solid-State Ckts v 42 #6 p. 1271 (2007).

Chen, J., "An Active Current-Sensing Constant-Frequency HCC Buck Converter Using Phase-Frequency-Locked Techniques", IEEE Trans Ultrasonics, Ferroelectrics, and Frequency Control v 55 #4 p. 761 (2008).

Martinez, J., and Conesa, A., "Linear-Assisted DC-DC Converter Based on CMOS Technology", IEEE PESC 2008.

Maxim Integrated Products, Application Note 4266, "An Efficiency Primer for Switch-Mode, DC-DC Converter Power Supplies", www.maxim-ic.com, Dec. 23, 2008.

Maxim Integrated Products, Application Note 2031, "DC-DC Converter Tutorial", www.maxim-ic.com, Nov. 29, 2001.

Zhang, C., and Shao, Z., "Controlled slew rate enhancement circuit for error amplifier in high frequency DC-DC converters", IEEE Asia Pacific Conference on Circuits and Systems (APCCAS) 2008 p. 1852.

PCT Notification of Transmittal of the International Search Report and the Written Opinion of the International Searching Authority, or the Declaration; Nov. 29, 2011; PCT/US2011/028229.

Office Response for U.S. Appl. No. 12/730,333, filed Mar. 24, 2010 titled "Voltage Regulation Bypass Resistance Control". Response filed Apr. 21, 2012.

\* cited by examiner

A) CONVENTIONAL CONVERTER

B) CONVERTER WITH BYPASS

VOLTAGE REGULATOR BYPASS RESISTANCE CONTROL

RELATED APPLICATIONS

This patent application is a continuation of U.S. patent application Ser. No. 12/730,333, filed Mar. 24, 2010, titled "Voltage Regulator Bypass Resistance Control".

FIELD OF THE DESCRIBED EMBODIMENTS

The described embodiments relate generally to power conversion. More particularly, the described embodiments relate to bypass resistance control of a voltage regulator.

BACKGROUND

Switched-mode DC-DC converters are widely employed when it is necessary to convert a supply voltage to a lower or higher output value, the output value being closely regulated, while simultaneously maintaining high efficiency. A switched-mode DC-DC converter consists of one or more switching elements directing current from a supply, such as a battery, to a storage element such as an inductor or capacitor. An exemplary buck inductive converter, shown schematically in FIG. 1, uses two switches (series switch, shunt switch) and an inductor to convert an input voltage $V_{in}$ to a lower-valued output voltage $V_{out}$. Note that a variety of other switched-mode converter topologies exist for varying applications, capable of both increasing ("boost") and decreasing ("buck") the input voltage. Furthermore, though N-type FET switch devices are indicated in FIG. 1, any appropriate switching means, including N- or P-type FETs or bipolar transistors, can be used.

The states of these switches (series switch, shunt switch) are controlled by voltage waveforms $V_{c,ser}$ and $V_{c,sh}$, shown in simplified form in FIG. 2. Note that the waveforms of FIG. 2 are appropriate for N-type FET switches; one or both waveforms might be inverted and offset in voltage if P-type switches, or bipolar switches, are employed. The series switch is on (closed) for a time $T_{on}$, during which current flows from the voltage supply (a battery in the exemplary converter of FIG. 1) into the output storage inductor $L_{out}$. During this time the current flowing through the output storage inductor increases approximately linearly with time. During the time $T_{off}$ the series switch is turned off (opened). After a brief dead time, required to ensure that the two switches are not both on simultaneously, the shunt switch is turned on (closed). Current flows from ground into the output storage inductor. During this time, the current decreases approximately linearly with time; however, if the inductor is sufficiently large relative to the switching period, the current will not fall to 0. (This is known as continuous mode operation.) At the end of the period $T_{off}$ the series switch is turned on again. The sum of $T_{on}$ and $T_{off}$ is the switching period T. The switching frequency $f_{sw}=1/T$. The duty cycle D is defined as the fraction of the switching period during which the series switch is on:

$$D = \frac{T_{on}}{T_{on} + T_{off}}$$

It may be shown that in steady-state continuous mode operation, if dead times and parasitic resistances can be neglected, the output voltage is proportional to the duty cycle:

$$V_{out}=DV_{in}$$

Since the output voltage is controlled by adjusting the width of the control pulses to the switching elements, this type of control is known as pulse-width modulation or PWM.

For any given embodiment, there must in general exist a minimum value of $T_{off}$ typically no less than the slim of the minimum dead times and the shortest time the shunt switch can be turned on (which is limited by the finite rise and fall times of the shunt switch, not shown in the figure). In specific implementations, other aspects of circuit operation may impose more stringent constraints on duty cycle than the pulse width alone. Thus, the duty cycle D has an achievable maximum value for a fixed switching frequency $f_{sw}$, corresponding (for a buck converter) to the maximum ratio of output voltage to input voltage. If the output voltage is substantially fixed, as is the case in many practical applications, the maximum value of D constrains the input voltage $V_{in}$ to be higher than some minimum value. When the voltage source is a battery, this constraint is equivalent to a limit on the usable lifetime of the battery before it must be charged or replaced.

One prior-art solution to this problem is to change the switching period T (and thus the switching frequency $f_{sw}$) to permit operation at higher duty cycles for the same minimum value of $T_{off}$ as shown in FIG. 3. The period during which the series switch is on is extended for the same minimum pulse width of the shunt switch and thus the same minimum value of $T_{off}$. The period increases from T to $T_{adj}>T$, and the switching frequency falls to $f_{sw,adj}<f_{sw}$. In practice, changes in frequency may be implemented by continuous changes in the duration of e.g. the on pulse, or by simply leaving one switch on continuously during some cycles, while switching it off in the normal (PWM) fashion in others. This latter technique is often referred to as "pulse skipping". If every other pulse is skipped, the switching frequency is reduced by a factor of 2, and thus the maximum attainable duty cycle is increased by roughly the same amount.

An exactly analogous problem can also arise at very low ratios of output to input voltage, where the period during which the series switch is on, $T_{on}$, becomes comparable to the minimum achievable pulse. In this case, it is again possible to reduce the switching frequency by extending the time $T_{off}$ or by skipping individual cycles, or allowing bursts of cycles alternating with times during which the switches are off, in all cases reducing the duty cycle D below what would be achievable at a fixed frequency. It is also common to allow discontinuous mode operation in this low-power pulse-skipping or burst-mode condition.

An exemplary control flow for frequency reduction is shown in FIG. 4. An output voltage is compared (step 410) with a reference voltage to establish whether the requested duty cycle from the PWM controller requires adjustment. The resulting requested duty cycle (step 420) is tested to see if it exceeds the maximum duty cycle that can be provided by the particular converter in use. If the requested duty cycle D exceeds the achievable maximum (step 430), the switching frequency is reduced (step 440) until the requested value of D can be achieved. (An additional control provision, not shown here, will increase the switching frequency, including returning it to the nominal value, when the required duty cycle falls.) The PWM is adjusted to the requested D (step 450). It will be understood that this algorithm may be implemented digitally, or may characterize the operation of an analog control circuit, or may be a mixture of the two approaches.

An example of this behavior for a typical commercial switched-mode converter is shown in FIG. 5: if the converter is employed at high duty cycles, as the input voltage falls, the switching frequency falls to maintain a fixed output voltage. For a typical lithium-based battery, the range of voltages shown span the operating life of the battery, so it is expected that converter switching frequency will drift slowly downwards throughout the whole battery lifetime or discharge cycle.

Another approach to obtaining higher output voltages is to bypass the switching regulator altogether by providing a low-resistance switching element (typically a transistor) that directly connects the voltage supply and an output of the converter. In the so-called bypass mode, the low-resistance bypass transistor and the series switch of the buck converter are both turned full on (that is, the duty cycle of the switching regulator is fixed at 100%), in order to minimize resistance between the battery and the output. As a consequence, the output voltage is no longer regulated.

A fixed switching frequency and its harmonics are relatively simple to filter from electronic circuitry, but varying frequencies are more difficult to remove from neighboring circuits. In conventional switched-mode converters, operating at switching frequencies of a few MHz or less, variations in switching frequency are known to give rise to increased problems with electromagnetic interference (EMI), and may also cause interference at audio frequencies if the initial switching frequency is low. There are numerous advantages to the use of a much higher switching frequency, as large as 100 MHz or greater, including reductions in the size of the output capacitance and inductance required, and improved speed of response to changing load conditions. In a typical application of such a converter, the output voltage of the converter is connected to an output power amplifier for a radio transmitter, such as the transmitter in a handset used in cellular communications. In such a case, the slight variation in output voltage at the switching frequency will be mixed with the intended output signal of the radio transmitter to create undesired "spurious" output signals, commonly known as spurs, at frequencies offset from the carrier frequency by the switching frequency (as well as its harmonics), as shown in FIG. 6. Spurious output signals may be subject to stringent requirements. For example, a cellular handset operating in the United States may transmit on a channel in the uplink band, from 824 to 849 MHz, and simultaneously receive a signal from a basestation at the corresponding paired channel 45 MHz higher, in the 869-894 MHz downlink band. These bands are shown graphically in FIG. 7. For a transmit frequency of 825 MHz and switching frequency of 100 MHz, the first high-side spur will occur at 925 MHz, outside of the intended receive band. However, if the operating frequency is allowed to fall to, for example, 65 MHz, the spur will lie within the downlink band, where it may interfere with neighboring handsets, and is thus subject to strict limits on effective radiated power. If the operating frequency is allowed to fall further to 45 MHz, the spur will lie within the paired receive channel to which the handset is attempting to listen; in this case, spurs must be comparable to thermal noise levels to avoid impacting receiver performance. Similar constraints exist for transmission in other bands.

It is therefore desirable to be able to operate high frequency switched-mode DC-DC converters at a fixed switching frequency, even at high ratios of output voltage to input voltage.

SUMMARY

An embodiment includes a method of controlling a bypass resistance of a voltage regulator. The method includes generating a regulated output voltage based upon a switching voltage. The switching voltage is generated through controlled closing and opening of a series switch element and a shunt switch element, the series switch element and the shunt switch element being connected between voltages based on an input voltage. Control of a duty cycle of the switching voltage is provided by sensing and feeding back the regulated output voltage. The bypass resistance is controlled based on an integration of a difference between the duty cycle and a maximum duty cycle.

Another embodiment includes another method of controlling a bypass resistance of a voltage regulator. The method includes generating a regulated output voltage based upon a switching voltage. The switching voltage is generated through controlled closing and opening of a series switch element and a shunt switch element, the series switch element and the shunt switch element being connected between voltages based on an input voltage. Control of a duty cycle of the switching voltage is provided by a control of a duty cycle of the switching voltage by sensing and feeding back the regulated output voltage with a pulse-width modulation loop. The bypass resistance is controlled based on a parameter related to the duty cycle with a bypass control loop, wherein a response time of the pulse-width modulation loop is faster than a response time of the bypass control loop.

Another embodiment includes a voltage regulator. The voltage regulator includes a series switch element and a shunt switch element connected between voltages based on an input voltage. A controller is operative to generate a switching voltage through controlled closing and opening of the series switch element and the shunt switch element, and a regulated output voltage is generated based upon the switching voltage. A duty cycle controller is operative to control a duty cycle of the switching voltage by sensing and feeding back the regulated output voltage. A bypass resistance is coupled between the input voltage and the regulated output voltage. A bypass controller is operative to control the bypass resistance based on an integration of a difference between the duty cycle and a maximum duty cycle.

Other aspects and advantages of the described embodiments will become apparent from the following detailed description, taken in conjunction with the accompanying drawings, illustrating by way of example the principles of the described embodiments.

DETAILED DESCRIPTION

The embodiments described provide a method of operating a DC-DC converter capable of delivering regulated output voltages whose value is very close to the available supply voltage, without reducing the switching frequency.

Figure 8:
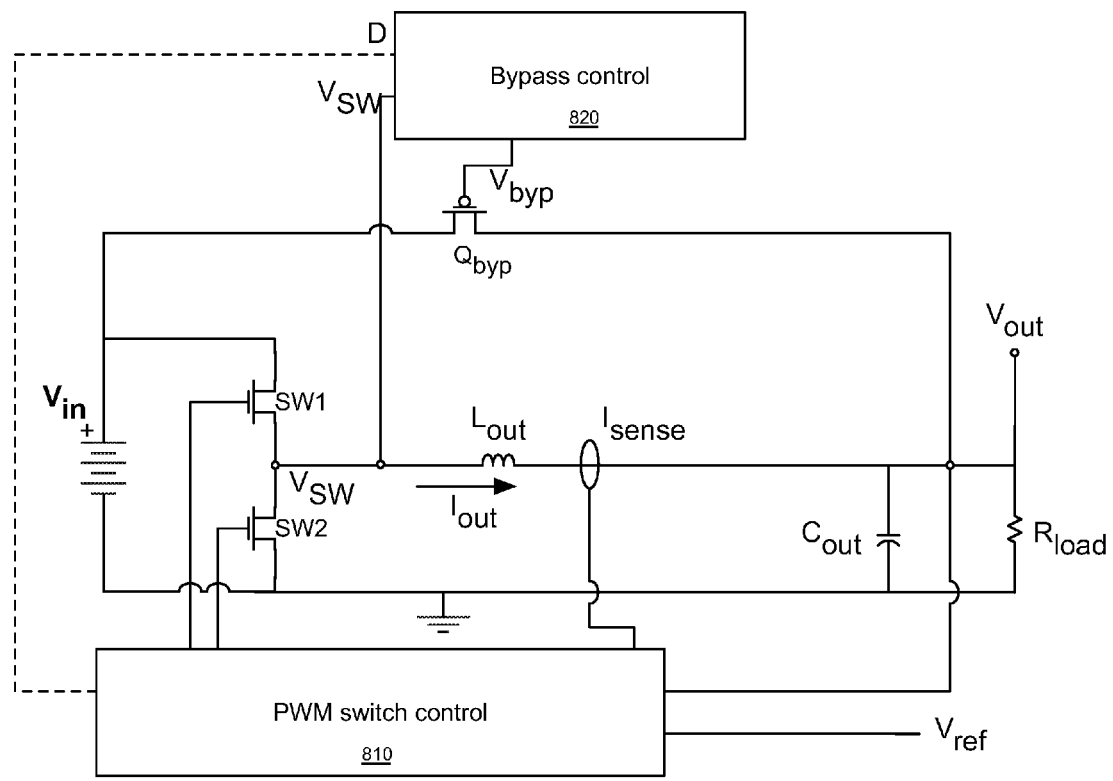
FIG. 8 shows an example of a block diagram of a voltage regulator that includes control of a bypass resistance.

FIG. 8 shows a voltage converter that includes bypass resistance control according to at least some of the described embodiments. An input voltage ($V_{in}$) is directed to a series switching element SW1, and a shunt switching element SW2; the common node (having a voltage potential of $V_{SW}$) between the two switches being connected to an output inductor $L_{out}$, to form a conventional synchronous buck converter. The input voltage ($V_{in}$) is shown as derived from a battery here, but any input supply voltage source can be used. The output voltage ($V_{out}$) is filtered by the capacitor $C_{out}$ and supplied to the load, depicted in FIG. 8 as a resistor $R_{load}$. The output voltage $V_{out}$ and the output current $I_{out}$ are both measured, as appropriate for a current-mode control scheme. However, a conventional voltage control may also be used.

The pulse-width modulation (PWM) switch control block 810 attempts to adjust the duty cycle D, and thus the times $T_{on}$ and $T_{off}$ of the series switch SW1, and the complementary times for the shunt switch SW2, to obtain the desired output voltage despite possible variations in the input supply and output load. Various means for achieving such adjustment include, for example, the difference between the output voltage and reference voltage being passed through an integrator, and the result being used as a threshold for a comparator driven by a sawtooth wave to produce a series of output pulses whose duration is adjusted to drive the error to 0 (voltage mode control). The difference between the reference voltage and the output voltage may instead be used to adjust the value of a threshold for the instantaneous output current, which when achieved triggers a change in the switch state (current mode control).

The exemplary embodiment of FIG. 8 additionally includes a bypass FET $Q_{byp}$, connected directly between the supply voltage $V_{in}$ and the output voltage $V_{out}$, but any means of providing a variable conductance between the supply voltage and the output voltage may be used. In an embodiment, the bypass FET may be connected to a separate output pad. This separate output pad is generally connected to the load using printed circuit wiring. A bypass controller 820 adjusts the voltage presented to the gate of the bypass FET based on the PWM requested duty cycle and the output node voltage. In normal operation at moderate duty cycles, the bypass device (FET $Q_{byp}$) is turned off and has no impact on the power consumption, efficiency, or response of the converter. However, when the requested duty cycle exceeds the maximum achievable duty cycle, the bypass device can be turned on. The conductance of the bypass device is adjusted to achieve the desired output voltage without exceeding the maximum duty cycle D, and without adjusting the switching period T or frequency $f_{sw}$.

Figure 9:
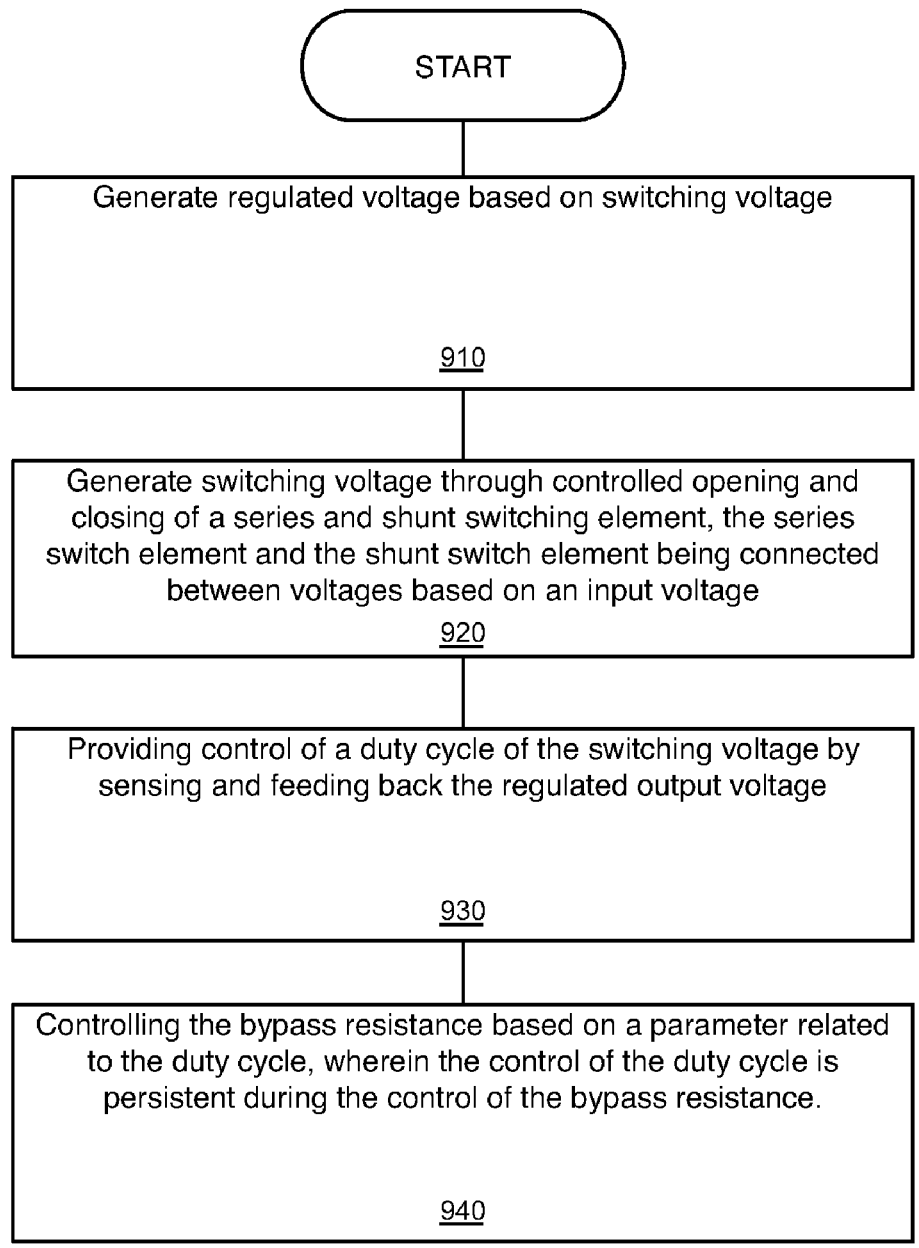
FIG. 9 is a flow chart that includes steps of an example of a method of controlling a bypass resistance of a voltage regulator.

FIG. 9 is a flow chart that includes steps of an example of a method of controlling a bypass resistance of a voltage regulator. A first step 910 includes generating a regulated output voltage based upon a switching voltage. A second step 920 includes generating the switching voltage through controlled closing and opening of a series switch element and a shunt switch element, the series switch element and the shunt switch element being connected between voltages based on an input voltage. A third step 930 includes providing a control of a duty cycle of the switching voltage by sensing and feeding back the regulated output voltage. A fourth step 940 includes controlling the bypass resistance based on a parameter related to the duty cycle, wherein the control of the duty cycle is persistent during the control of the bypass resistance. The control of the duty cycle is persistent during the control of the bypass resistance in that the control of the duty cycle continues (the control of the switching of the switches is maintained) no matter what the level of the control of the bypass. The bypass control further enables maintenance of the output voltage at a desired level when the input voltage decreases, by adaptively adjusting the bypass resistance. Additionally, the switching frequency can be maintained.

As shown in FIG. 8, the bypass resistance couples the input voltage to the regulated output voltage. Embodiments of the control of the bypass resistance are continuous in the sense that the bypass resistance is controllable over more than two values. Other embodiments include the bypass resistance being digitally controlled over greater than two values, such as, "on" and "off".

Embodiments include the bypass resistance being controllably turned on if the parameter related to the duty cycle is sensed to be above a first threshold, and/or the bypass resistance being controllably turned off if the parameter related to the duty cycle is sensed to be below a second threshold.

As will be described, one embodiment of the control of the bypass resistance includes frequency detection of the switching voltage. As described, embodiments of the voltage regulator includes an output storage inductor, and wherein the method further includes adjusting a conductance of at least one of the series switch element and shunt switch element based at least in part on sensing a negative current flowing through the output storage inductor. Additionally, as will be described, embodiments of at least one of the series switch element and shunt switch element includes switch segments, and the method further includes adjusting conductance of at least one of the series switch element and shunt switch element by activating or deactivating one or more of the switch segments based at least in part on sensing a negative current flowing through the output storage inductor.

Figure 10:
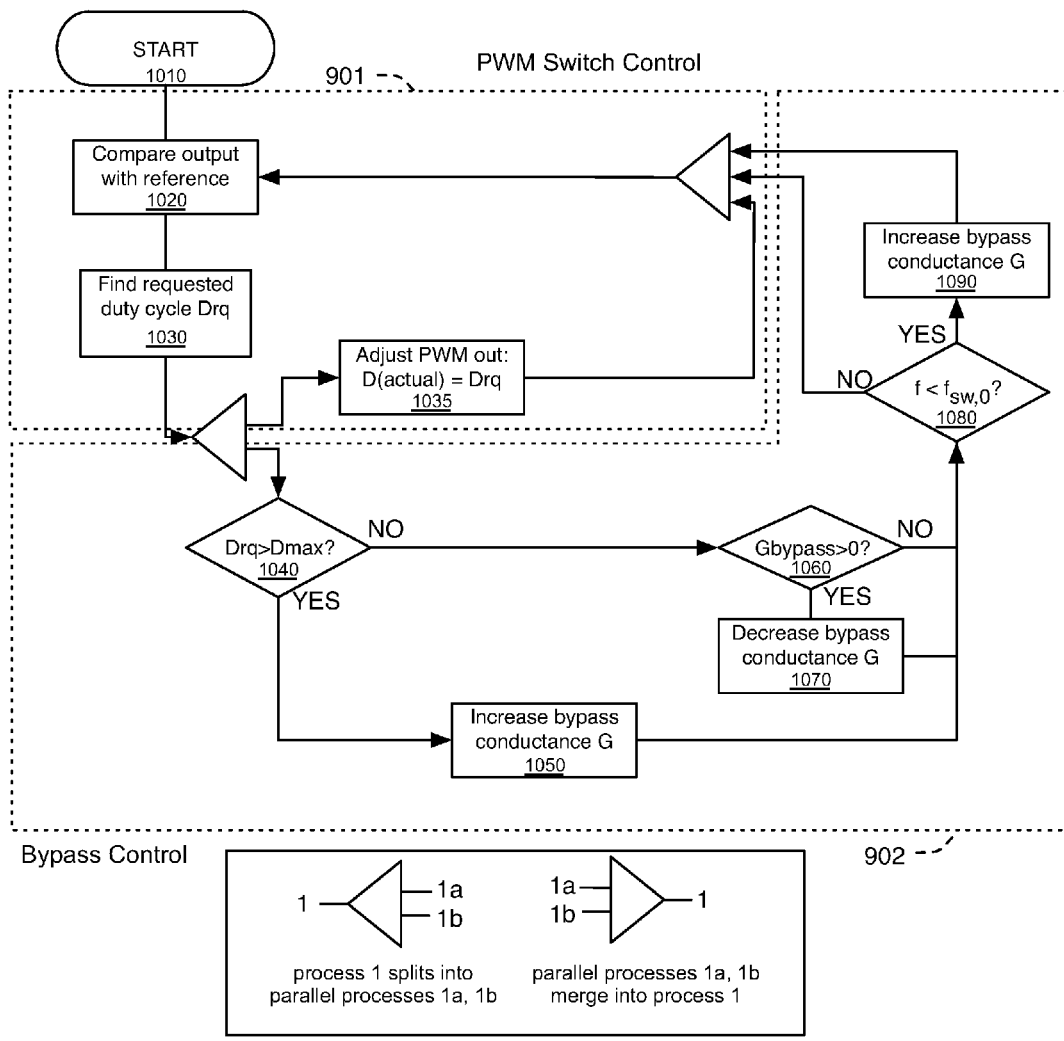
FIG. 10 is a flow chart and control loop depiction that includes functional steps of an example of a method of controlling bypass resistance of a DC-DC converter, allowing operation of the converter with a fixed switching frequency and with a high duty cycle.

FIG. 10 is a flow chart and control loop depiction that includes functional steps of an example of a method of controlling bypass resistance a DC-DC converter, allowing operation of the converter with a fixed switching frequency and with a high duty cycle. Referring to FIG. 10, the control approach starts 1010 in the conventional fashion by testing (comparing) the output voltage against a desired target or reference voltage at step 1020, to find a new requested duty cycle D at step 1030, which the pulse-width modulation unit (PWM) attempts to use for control of the switches SW1 and SW2. Note that for Drq>Dmax, the actual behavior of the switches, and consequently of the voltage $V_{SW}$, may not correspond to the behavior requested by the controller, since as noted above the maximum duty cycle may in part be established by the limitations of the control and switch circuitry.

If the requested duty cycle is larger than the target maximum duty cycle (step 1040), the controller requests that the conductance of the bypass be increased (step 1050) (in the exemplary embodiment, accomplished by adjusting the voltage to the gate of the FET). If the requested duty cycle is less than the target maximum duty cycle, and the bypass conductance is not 0 (step 1060), the bypass conductance is reduced (step 1070).

Figure 1:
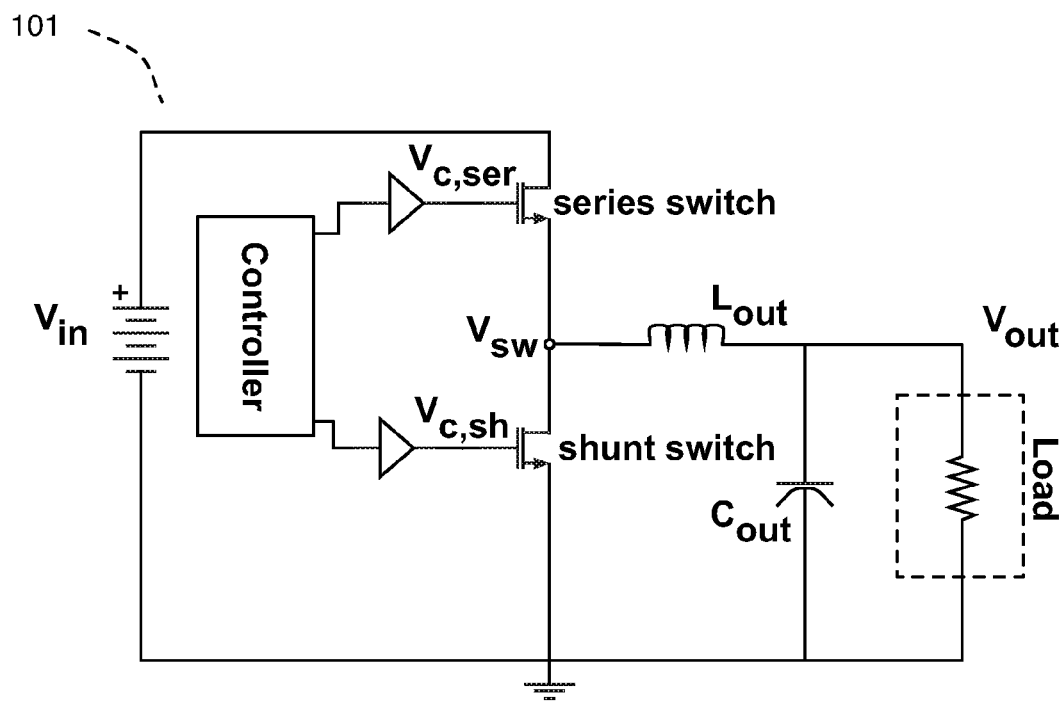
FIG. 1 shows an example of prior art buck inductive voltage converter.
Figure 2:
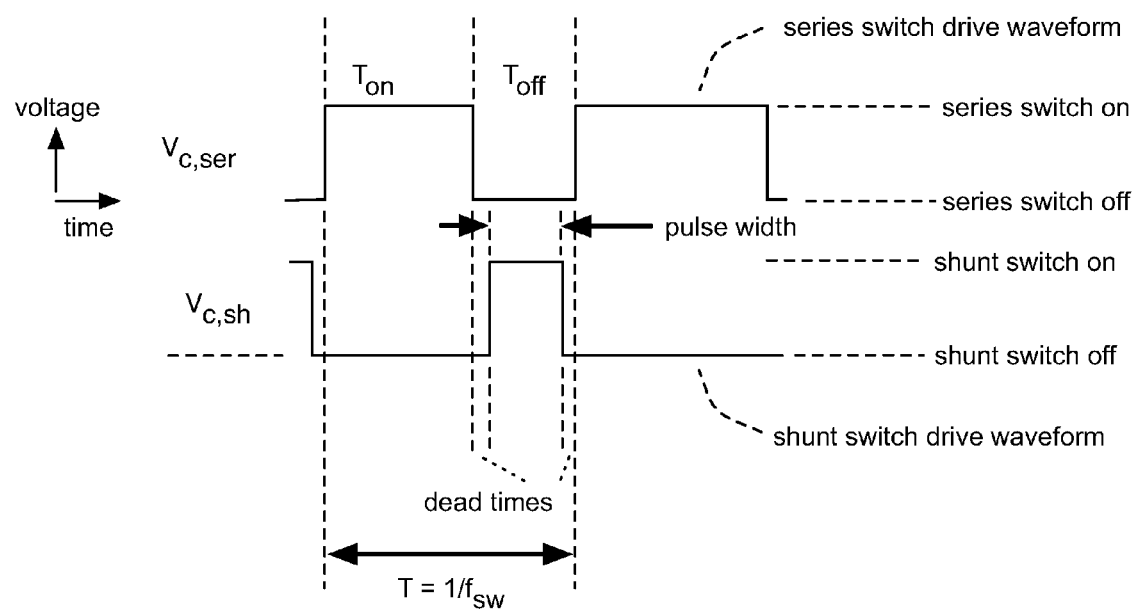
FIG. 2 shows an example of a voltage control waveforms for controlling the states of the switches of the buck inductive voltage converter of FIG. 1.
Figure 3:
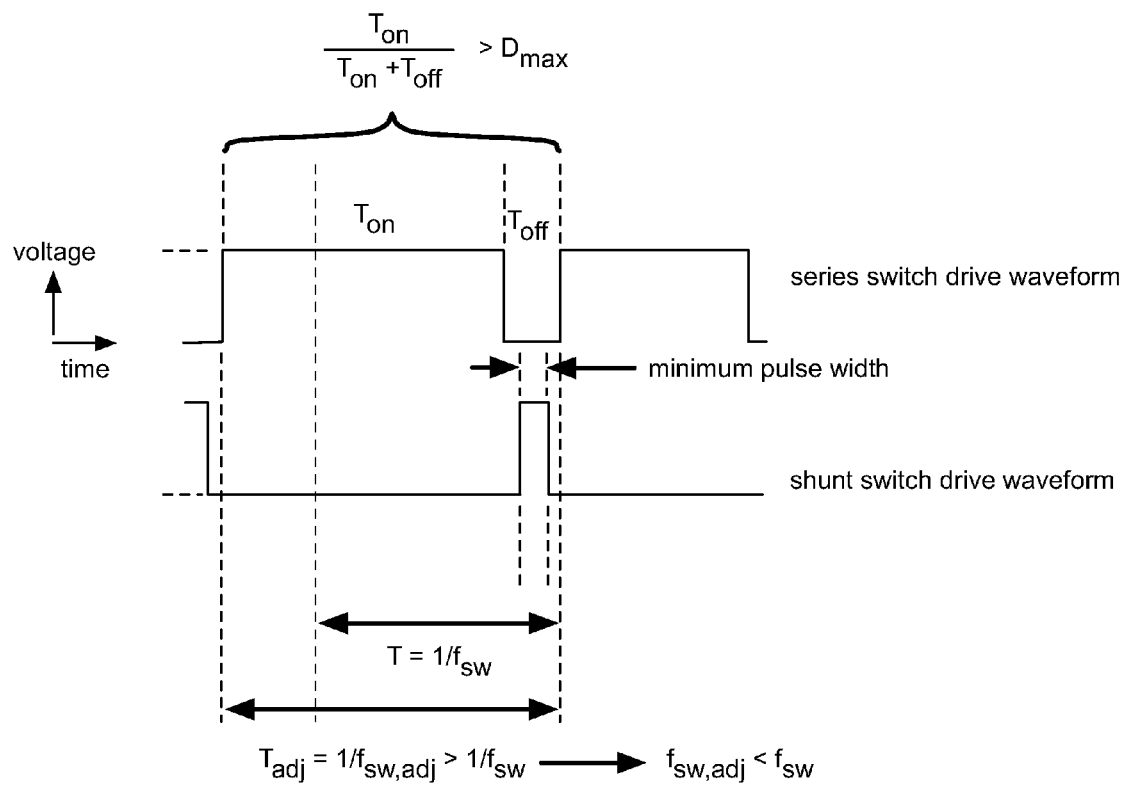
FIG. 3 shows an example of the voltage control waveforms that include adjustment of a switching period to provide higher duty cycles with a fixed minimum pulse width.
Figure 4:
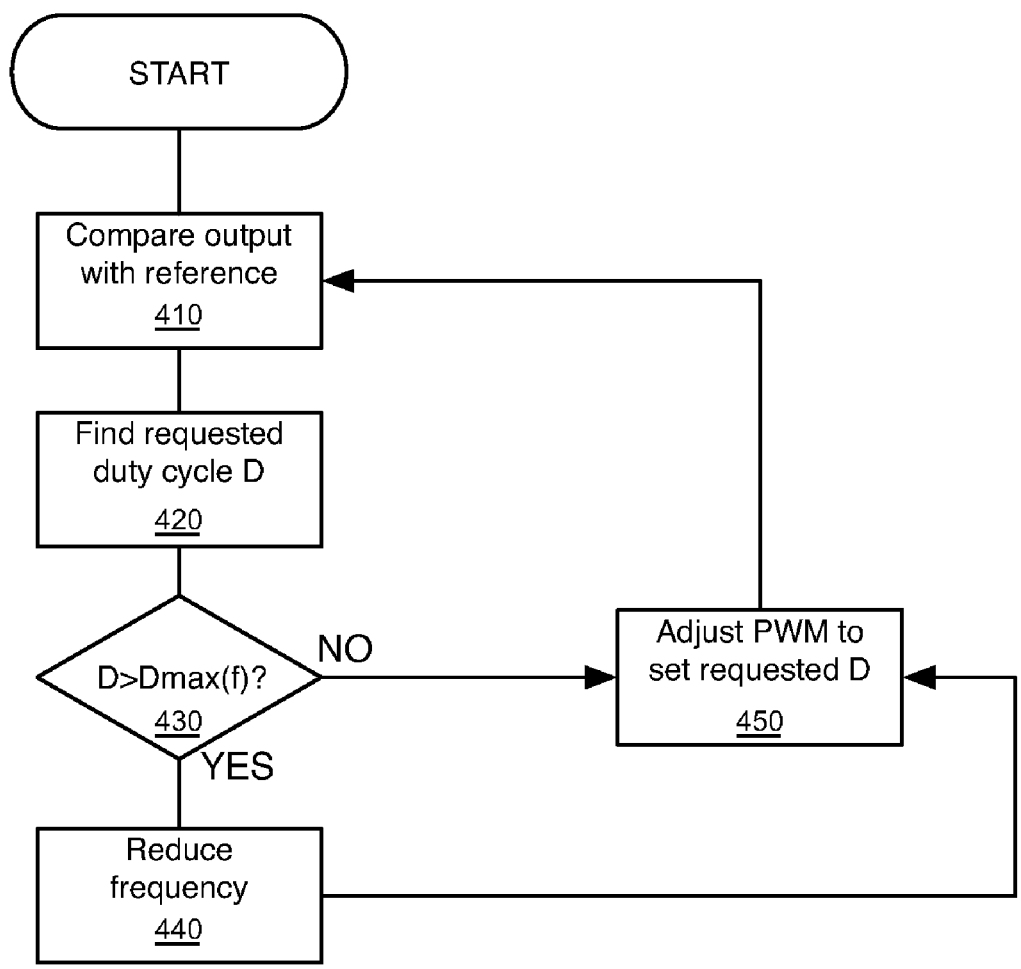
FIG. 4 is a flow chart that includes steps of a method of pulse width modulation control for achieving high duty cycles through adjusting a switching period or switching frequency.
Figure 5:
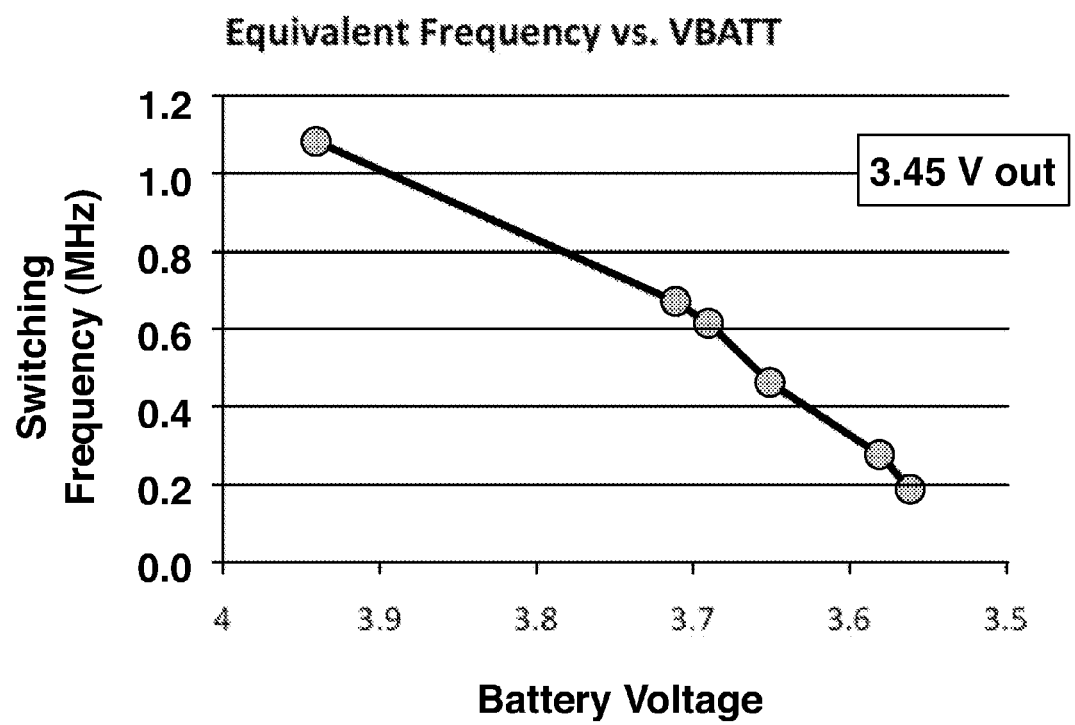
FIG. 5 is a plot that depicts operation of a typical DC-DC converter at high output voltage conditions as the available input voltage changes.
Figure 6:
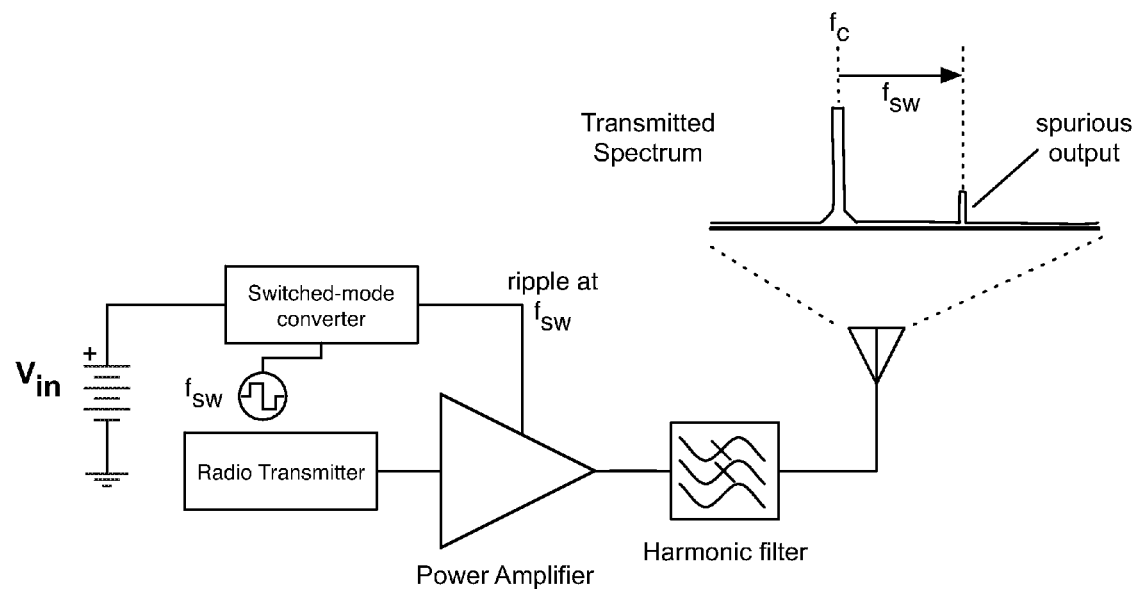
FIG. 6 shows an example of a block diagram of a radio transmitter that includes a switched converter, and a frequency spectrum that includes a spurious output signal.

Note that this algorithm may be implemented digitally, or may summarize the operation of an analog control circuit, or may be a mixture thereof. In FIG. 10, the PWM control 901 and Bypass control 902 blocks are depicted as being performed in parallel (that is, simultaneously), but these operations may be performed sequentially as long as the rate of update of the control information is sufficiently fast relative to the switching period to maintain control stability. The exact control parameters to be employed in realizing a controller according to FIG. 10 vary depending on the switching frequency, application requirements, and components chosen. However, to ensure stability, embodiments include the PWM loop 901 having a faster response time (for an analog implementation) or a faster update rate (for a digital implementation) than the bypass control loop 902. Under conditions of low inductor current, stability may be degraded if relatively long dead times between turning off SW1 and turning on SW2 (defined in FIG. 2) are used when the Bypass control block is active. In an embodiment using a 35 MHz switching frequency, the dead time between turning off SW1 and turning on SW2 should not exceed 700 psec to ensure good stability for inductor currents less than approximately 100 mA. Note that under these conditions, the dead time between turning off SW2 and turning on SW1 should be minimized, both to ensure stability and to obtain the largest possible duty cycle.

In an alternative embodiment, instead of detecting the duty cycle D and comparing it to the maximum value $D_{max}$, the control algorithm may monitor the time $T_{off}$, or the time $T_{on}$, either directly or through a derived voltage or current, and compare it to a minimum allowed time.

Figure 7:
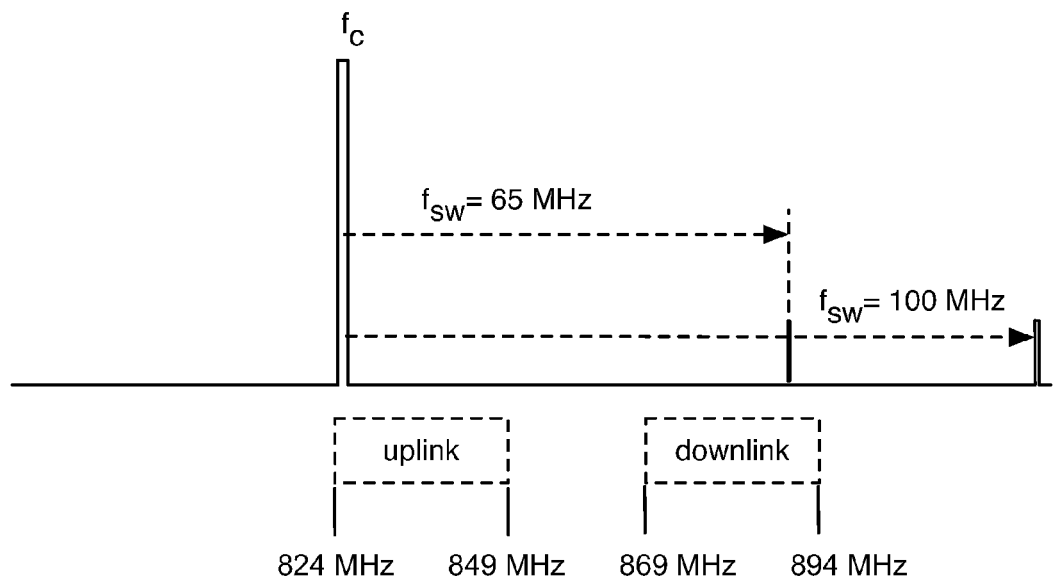
FIG. 7 shows an example of transmit (uplink) and receive (downlink) channels of a wireless device.

A second, unintended source of changes in switching frequency must also be accounted for in the control scheme. When the requested duty cycle exceeds the achievable duty cycle, the control circuit, particularly if implemented as an analog sawtooth comparator, may skip $T_{off}$ periods. Skipping every other period will result in an effective doubling of the switching period, or halving of the switching frequency. Similarly, skipping several consecutive $T_{off}$ periods may further reduce the effective switching frequency. Since the new frequency components are equal to the original switching frequency divided by an integer, these are known as subharmonic oscillations. Subharmonic oscillations are nonlinear, and may be sporadic. Sporadic subharmonic oscillations in a converter being used by a power amplifier will lead to spurious outputs at subharmonic offsets from the carrier frequency; by consideration of FIG. 7, it may be observed that if the switching frequency is chosen to avoid spurious radiation in critical bands, spurs at subharmonic offsets may nevertheless lie within the critical bands, leading to unacceptable radio performance. Subharmonic operation allows the desired output voltage to be achieved at a reduced $f_{sw}$; if duty cycle alone is monitored by the bypass controller, it may erroneously judge that the operating requirements are being met and reduce the conductance of the bypass.

To avoid subharmonic oscillations, the bypass controller is provided with the voltage at the common node between the converter switches, $V_{SW}$, as a control input. The bypass controller extracts the current switching frequency and compares it to the nominal frequency (step 1080 of FIG. 10). If the current switching frequency falls substantially below the nominal frequency, indicative of subharmonic oscillations, the bypass conductance is further increased to suppress them (step 1090 of FIG. 10). The SW1 or SW2 input signals (in an embodiment, directed to the gate of the switching FET) can also be used to detect the lack of a switching edge within a given switching cycle. However, it is important to note that in some cases subharmonic oscillations may occur because the requested pulse is too short to allow SW2 to pull the node $V_{SW}$ to ground. When this occurs, the $V_{SW}$ node voltage vs. time will be missing edges that are present in the control voltages, and it is significantly more difficult to detect subharmonic oscillations by monitoring the control voltages than the $V_{SW}$ node voltage. In FIG. 10, frequency detection is depicted as taking place sequentially after duty cycle detection, but these processes may also proceed in parallel, with sequential or simultaneous adjustments of bypass conductance.

Figure 11:
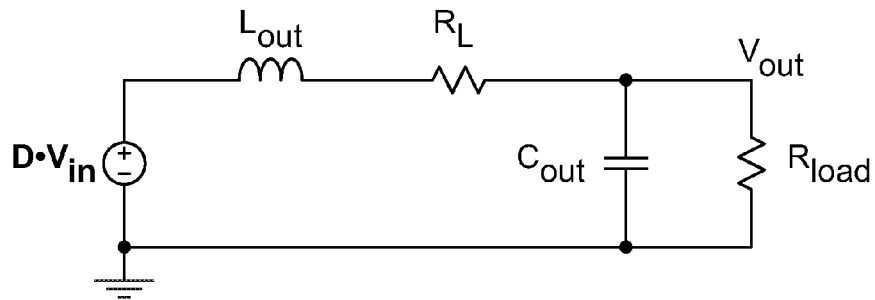
FIGS. 11A and 11B show examples of small-signal equivalent circuits for a conventional buck converter and converter with a bypass resistance element.
Figure 11:
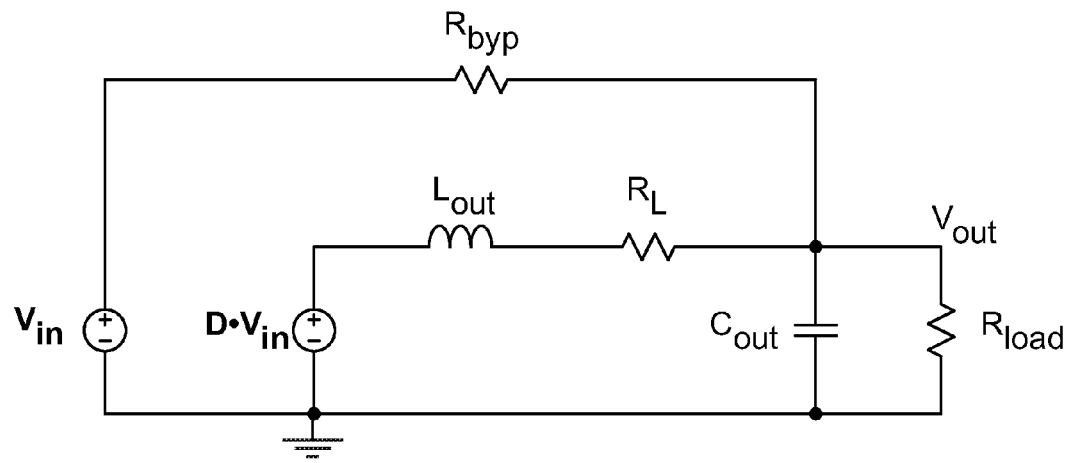

Design requirements for the bypass conductance can be established with the aid of a simplified small-signal equivalent circuit for a converter system. Small-signal equivalent circuits for a conventional converter, and a converter with a bypass conductance, are depicted in FIG. 11. Here the effect of the switching converter is absorbed into an effective voltage source equal to the product of the duty cycle and the actual input voltage. The parasitic resistance of the output inductor is explicitly shown as $R_L$. On practice, this resistance may also include typically-smaller losses due to the finite conductance of the switching elements SW1 and SW2, the series resistance of the output capacitor, and other minor sources of loss.) Continuous conduction operation is assumed.

By reference to FIG. 11, the output voltage for a conventional converter may be obtained:

$$V_{out} = V_{in} \frac{D \cdot R_{load}}{R_{load} + R_L} = V_{in} \frac{D \cdot G_L}{G_{load} + G_L}$$

where the terms $G_L$ and $G_{load}$ represent the conductances ($1/R_L$ and $1/R_{load}$, respectively) corresponding to the inductor equivalent series resistance and load resistance. In the limit where the parasitic losses represented by $R_L$ are small, this expression becomes equivalent to the earlier statement that the output voltage is the product of the duty cycle and the input voltage. Typical values for an exemplary high-speed converter are $D_{max}$=0.86, $R_{load}$=8 ohms, $R_L$=0.6 ohms, and a target output voltage $V_{out}$ of 3.2 V; the required input voltage for this example is 4 V (a conversion ratio $V_{out}/V_{in}$ of 80%), exceeding that available from a typical lithium battery over most of its useful life.

When the bypass conductance is added to the circuit, the output voltage becomes:

$$V_{out} = V_{in} \frac{G_{byp} + D \cdot G_L}{G_L + G_{load} + G_{byp}}$$

where $G_{byp}$ is the conductance of the bypass, here the transistor $Q_{byp}$. This expression may be solved to obtain the bypass conductance required to support a target conversion ratio, expressed in terms of the load and loss conductances:

$$G_{byp} = \frac{\left(\frac{V_{out}}{V_{in}}\right) G_{load} + G_L\left(\left(\frac{V_{out}}{V_{in}}\right) - D\right)}{\left(1 - \left(\frac{V_{out}}{V_{in}}\right)\right)}$$

Figure 12:
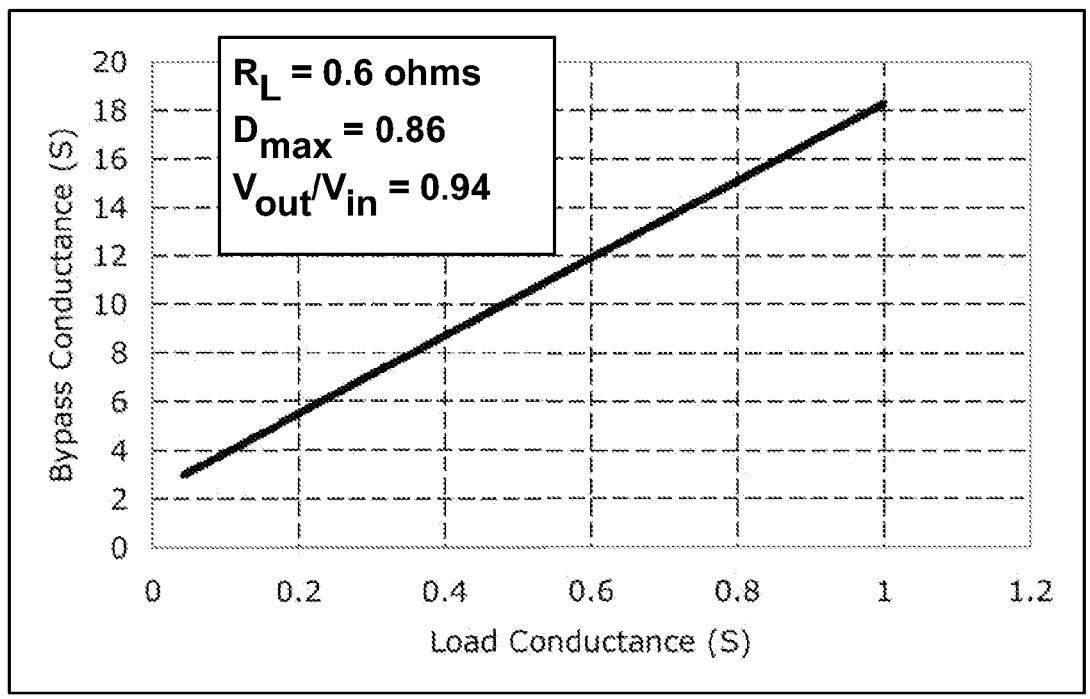
FIG. 12 is a plot that shows an example of bypass conductance required to provide a conversion ratio of 94% with a maximum duty cycle of 86%, as a function of load conductance.

This relationship is depicted graphically, for the parameter values used above, in FIG. 12. As the load conductance increases (equivalent to an increased output current), the required bypass conductance to achieve a given output increases.

The value of the bypass conductance $G_{byp}$ is adjusted to provide the desired maximum output voltage (or equivalently the desired maximum conversion ratio). For example, using the parameter values from the example above, to achieve a 3.2 V output from a 3.4 V input (corresponding to a target conversion ratio of 94% and 400 mA output current into 8 ohms), a bypass conductance of about 4.2 S (corresponding to a bypass resistance of 0.24 ohms) is required. Note that, although the required conductance is large compared to the load conductance (here 0.125 S), it is still small compared to the typical conductance of the switching devices SW1 and SW2, which are chosen to have minimal impact on the overall system efficiency. Thus, addition of the bypass conductance to an integrated converter has modest impact on the cost of the resulting integrated circuit.

The use of the bypass conductance allows high conversion ratios to be achieved even at high fixed switching frequencies, but system efficiency is impacted. The system efficiency η can be estimated using the equivalent circuit of FIG. 11:

$$\eta = \frac{\left(\frac{V_{out}}{V_{in}}\right)^2 \cdot G_{load}}{(1-D)\left(\left(\frac{V_{out}}{V_{in}}\right) - D\right) G_L + \left(\frac{V_{out}}{V_{in}}\right) G_{load}}$$

Figure 13:
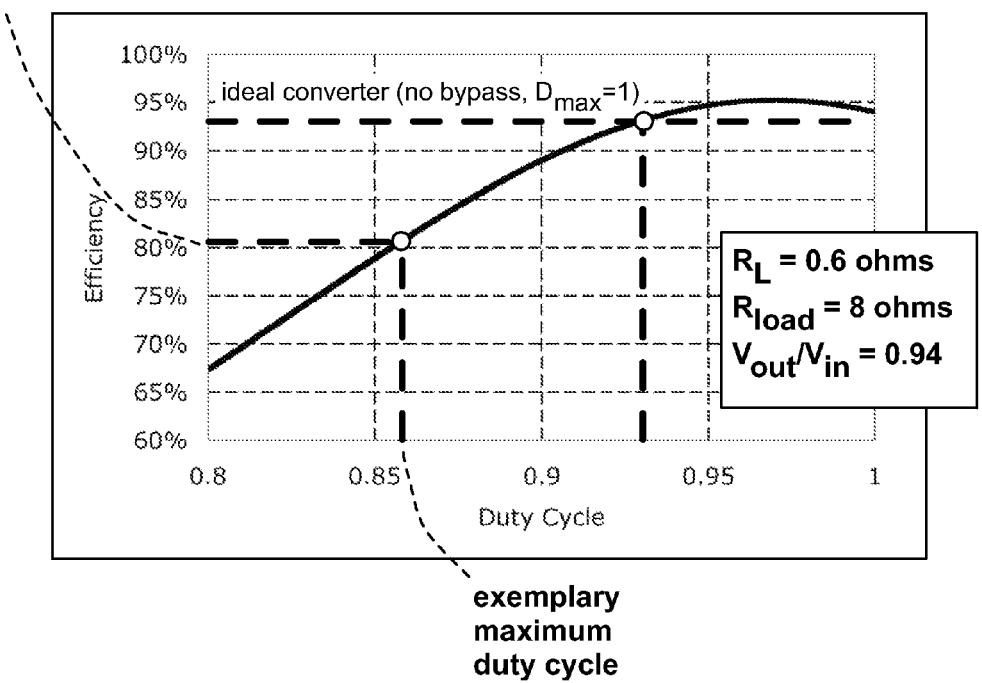
FIG. 13 is a plot that shows efficiency as a function of duty cycle for a bypass converter at a conversion ratio of 94%, and efficiency of an ideal converter with no duty cycle limit and no bypass.

The resulting relationship between efficiency and duty cycle, for the load and parasitic resistances previously used (8 and 0.6 ohms, respectively) is shown in FIG. 13. (Note that this simplified estimate includes only the effects of losses represented by $R_L$, and ignores effects such as the additional fixed losses in the driver and control circuitry.) Also shown is the ideal efficiency of the converter without a bypass, obtained as:

$$\eta_{no\ bypass} = \frac{R_{load}}{R_{load} + R_L} = \frac{G_L}{G_{load} + G_L}$$

It is apparent that for duty cycles less than about 0.93, the efficiency of the converter with the bypass path is less than that of the ideal converter without it. Thus, for example, if the maximum duty cycle is taken to be 86% as before, the converter with bypass will be able to achieve a conversion ratio of 94%, but the efficiency of conversion will be reduced from about 93% to about 81%. Constant-frequency operation at very high conversion ratios must be traded against system efficiency.

Figure 14:
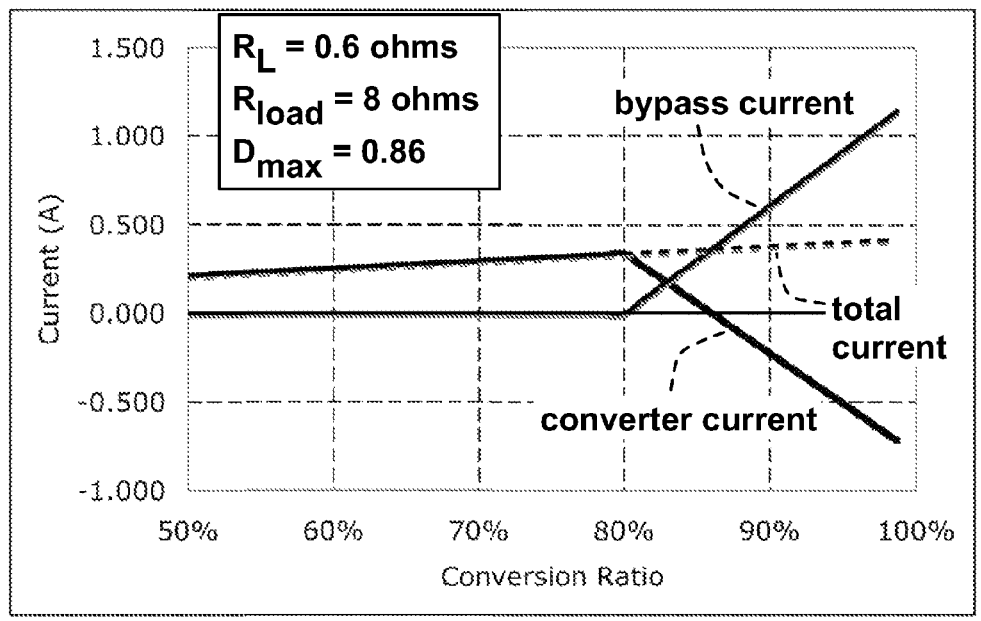
FIG. 14 is a plot that shows an example of a decomposition of the total output current of an exemplary converter with bypass into converter current and bypass current.

Referring again to FIG. 11, it should be recalled that the intent of the bypass structure is to achieve output voltages greater than $DV_{in}$, implying as a consequence that when the bypass is active, current may flow from the output node into the equivalent supply voltage $DV_{in}$ (which represents the output of the switched converter and output inductor). An example of this behavior is depicted in FIG. 14. Here the current denoted "converter current" is the current flowing through the output inductor $L_{out}$ and the equivalent loss resistance $R_L$ of FIG. 11. The "bypass current" is the current flowing through the bypass resistance $R_{byp}$. The total current is the current flowing through the load $R_{load}$. It may be observed that the converter current becomes negative when the conversion ratio is equal to the maximum achievable duty cycle $D_{max}$. For conversion ratios higher than $D_{max}$, current flows back into the converter from the bypass. Since this current is not delivered to the load, it is in general undesirable, and it may be useful to take measures to minimize it.

Figure 15:
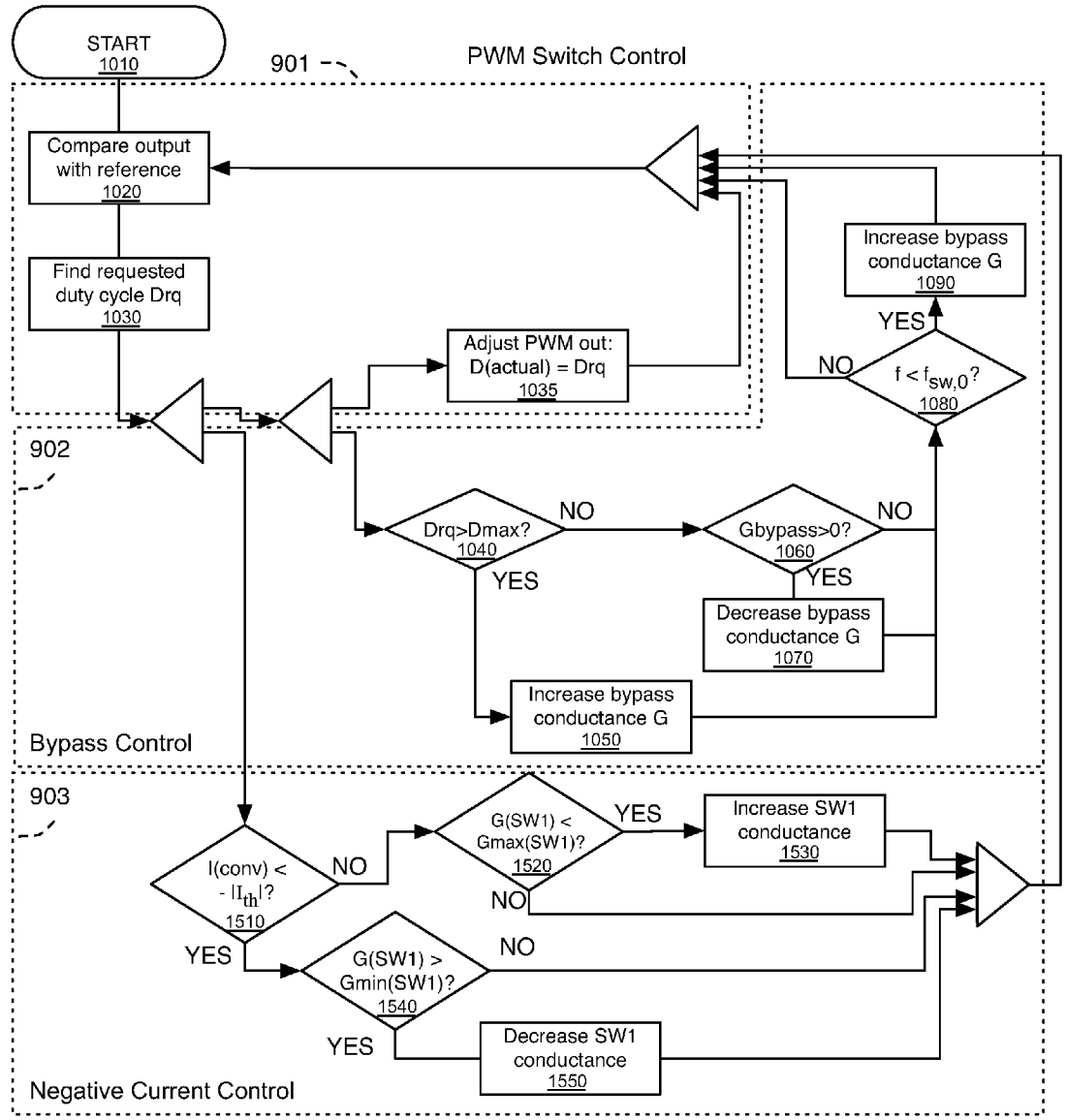
FIG. 15 is a flow chart that includes steps of an example of a control algorithm within minimization of negative converter current.
Figure 17:
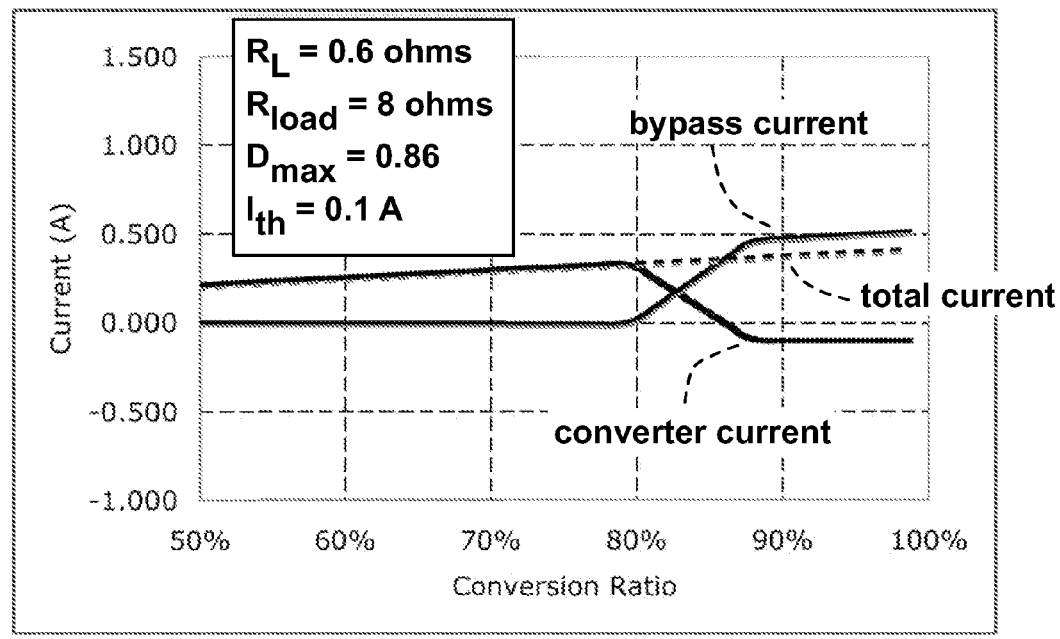
FIG. 17 is a plot that shows decomposition of the total current of an exemplary converter with bypass into converter current and bypass current, with application of negative current minimization.

An exemplary approach is shown in FIG. 15. When the current passing through the output inductor, $I_{conv}$, becomes more negative than a desired threshold value (step 1510), and the conductance of switch SW1 is greater than its minimum value (step 1540), the conductance of the series switch in the converter, SW1, is reduced (step 1550) if possible. This can be achieved by reducing the gate drive available for SW1, as discussed in connection with FIG. 18 below. An alternative embodiment makes use of a segmented switch SW1, allowing independent control of the segments; unneeded segments can then be turned off to reduce SW1 conductance while still maintaining regulation. The optimal conductance of SW1 is established from a tradeoff between system efficiency and effectiveness of regulation using the buck converter section. If the current is less negative than the threshold (step 1510), and the conductance of switch SW1 is less than its maximum value (step 1520), the SW1 conductance is increased (step 1530). As described above in connection with FIG. 10, this control method may be implemented using analog circuitry, digital circuitry, or a combination of the two. The PWM switch control, bypass control, and negative current control blocks may operate in parallel, or may be performed in sequence, so tong as the rate of update is sufficient to ensure controls stability. The resulting change in system behavior is shown in FIG. 17: negative current is limited to a modest threshold value, after which the inductor output current increases only as fast as the load current. An embodiment includes the response time being the shortest (or equivalently, the update rate should be fastest) for the PWM loop 901 (FIGS. 10 and 15), relative to loop 902 (FIGS. 10 and 15) controlling the bypass conductance. Loop 903 (FIG. 15) controlling the switch conductance should be slower than either of the loops 901 or 902, since the primary effect of the negative current control loop is on efficiency rather than instantaneous operating conditions. Note that the conductance of SW2 can also be changed along with that of SW1. It should be noted that when the conductance of the switches SW1 and/or SW2 is changed, control loop stability requirements may also change. Therefore, control stability should be examined to ensure control stability under all envisioned conductance configurations.

Figure 16:
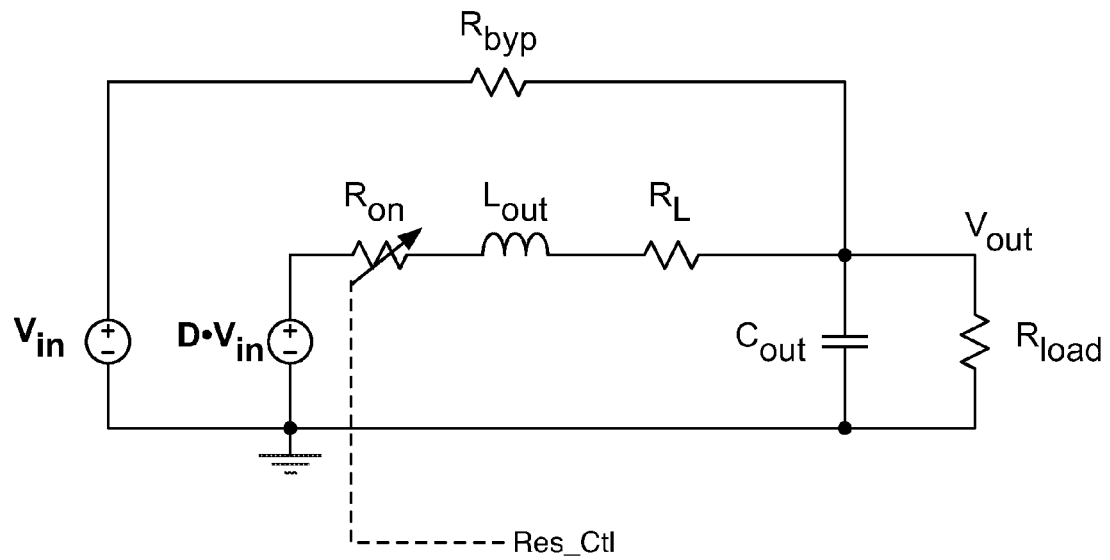
FIG. 16 shows an example of a small-signal equivalent circuit of a converter with bypass and negative current control through a variation of switch conductance.

The corresponding small-signal equivalent circuit for a converter with negative current reduction is shown in FIG. 16. The same expressions employed above can still be used to analyze operation of the converter, with the substitutions:

$$R_L \rightarrow R_L^* = R_L + R_{on}(\text{Res\_Ctl})$$

$$G_L \rightarrow G_L^* = \frac{G_L G_{on}(\text{Res\_Ctl})}{G_L + G_{on}(\text{Res\_Ctl})}$$

where $R_{on}(\text{Res\_Ctl})$ and $G_{on}(\text{Res\_Ctl})$ denotes the on-resistance and on-conductance, respectively, of the switches SW1 or SW2, taken here to be dependent on a control voltage Res_Ctl, as discussed below in connection with an exemplary embodiment shown in FIG. 18.

In a further embodiment, the switch SW1 can be turned off (along with SW2) when the current through it reaches 0 at high duty cycle. However, this embodiment changes the control model during operation, since with switches SW1 and SW2 both off, voltage regulation is accomplished purely by $Q_{byp}$ acting as a linear regulator. Since the switches are not active, the duty cycle is fixed at 100% and cannot be used as a control input; instead, it is necessary to switch control of the bypass conductance to depend directly on the output voltage or some correlate thereof. For some embodiments, discontinuous changes in the control model during normal operation are likely to produce complex and undesirable behavior, possibly leading to addition spurious output and other deleterious consequences, and are to be avoided.

Figure 18:
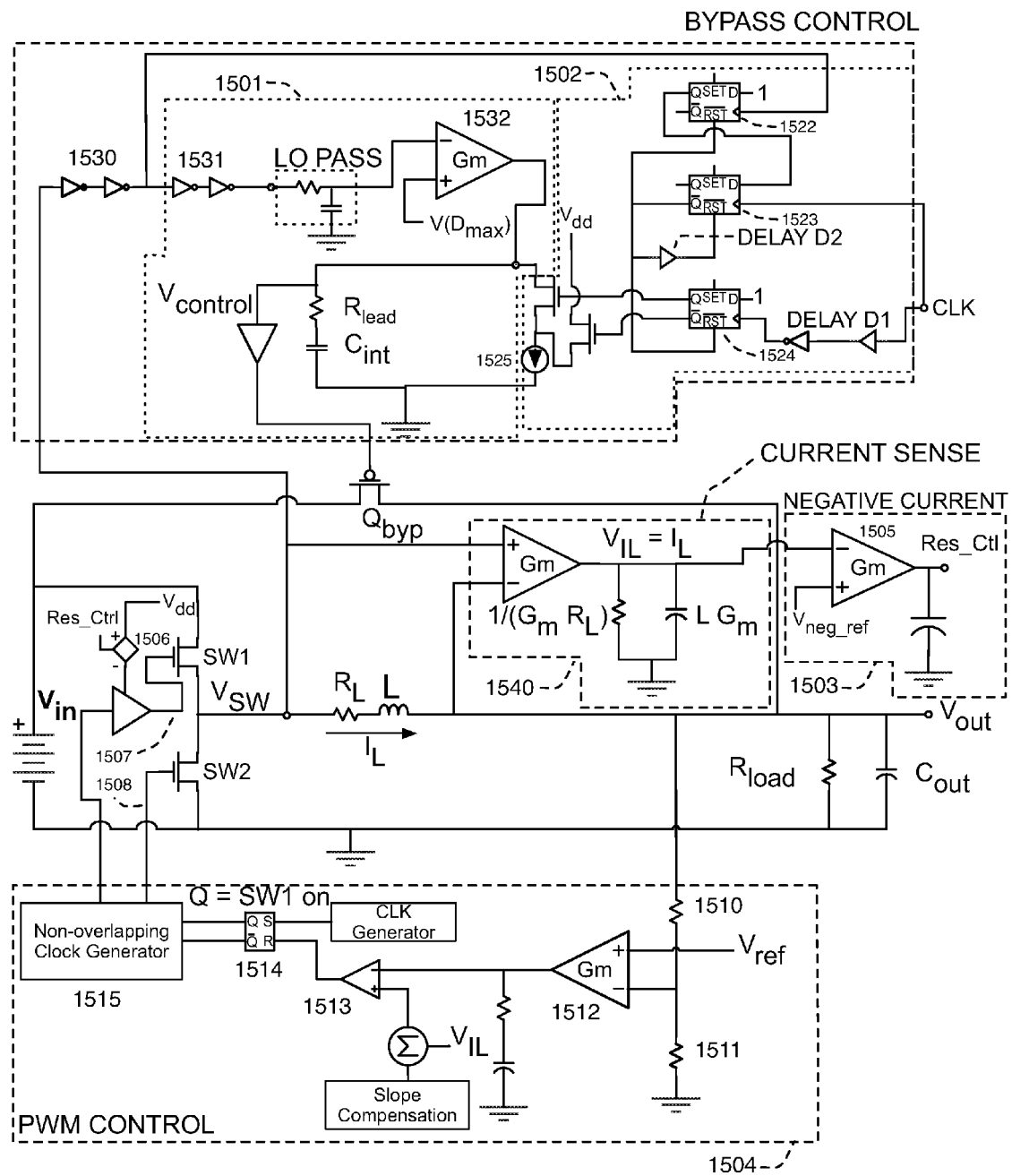
FIG. 18 shows an example of a block diagram of a bypass converter that can employ the described embodiments.

An exemplary implementation that includes additional detail is shown in FIG. 18. In the implementation shown, the control scheme of FIG. 10 is implemented employing primarily analog components, as will be described below; but alternative embodiments using digital or hybrid control schemes are also possible. A substantially conventional buck converter is constructed from the series switch SW1, the shunt switch SW2, and the output inductor L with corresponding equivalent series resistance $R_L$. The output voltage and current $V_{out}$ and $I_L$ are both used as control inputs. The output voltage is extracted with a resistive divider 1510 and 1511, and directed to an error transconductance amplifier 1512, which compares it to the desired output reference voltage $V_{ref}$; the output of the error amplifier is integrated to produce a reference voltage for the current control amplifier 1513. The output current is estimated in this embodiment by integrating the voltage across the inductor using the circuit 1540, with appropriate toss correction, but any means of detecting the output current may be used, such as sensing the voltage across a series resistive element. The resulting voltage proportional to the instantaneous current is added to a slope compensation input (a descending sawtooth wave), as is known in the art to promote stability at duty cycles greater than 0.5. The result is compared to the output of the voltage error amplifier and integrator in the amplifier 1513, to set an S/R latch 1514 which in turn drives the non-overlapping clock generator 1515 that controls the converter switches. The resulting controls are substantially conventional for a current-controlled buck converter, and may be implemented in a variety of alternative fashions known in the art.

A bypass element $Q_{byp}$, here implemented as a PMOS PET, provides a variable conductance between the supply voltage and the output voltage. To implement the inventive constant-frequency control, the voltage at the common node $V_{SW}$ is passed through a pair of inverting amplifiers 1530, which serve to render the time-dependent waveforms more square and sharpen the transition between the possible states of the common node voltage. The output voltage of the second inverter is then directed to the subharmonic detector circuit 1502, which wilt be described below, and through an additional pair of inverters 1531 to a low-pass filter. The low-pass filter is chosen to have a time constant RC of from about 2 to 20 switching periods of the converter, converting the time-dependent node voltage $V_{SW}$ into an average voltage linearly dependent on the current duty cycle D. This voltage is compared to a reference voltage, which can be used to establish the maximum value of D below which the bypass conductance is set to 0. The transconductance amplifier 1532 produces an output current proportional to the degree to which D exceeds $D_{max}$. The output current is integrated in the capacitor $C_{int}$. An optional phase lead resistor $R_{lead}$ may be added to improve stability. The capacitor voltage is directed via a non-inverting buffer amplifier to the bypass element control, thus increasing bypass conductance when the duty cycle exceeds the maximum allowed duty cycle.

The output voltage is also directed to a frequency detector, consisting of three D flip-flops 1522, 1523, and 1524. The first flip-flop 1522 is triggered on each rising edge of $V_{SW}$, pulling the output Q high since the data line is always pulled high. If the input of the second flip-flop 1523 is high, the $\overline{Q}$ output is pulled low at the clock rising edge. This resets both flip-flops 1522 and 1524. Flip-flop 1524 $\overline{\text{RESET}}$ is thus actuated when the clock edge delayed by D1 arrives at the clock input, so no output results. After a further delay (D2−D1), the second flip-flop 1523 resets itself and the cycle repeats.

In the case where sub-harmonic oscillations are occurring, cycles will occur where there is no rising edge of $V_{SW}$, so that the input to flip-flop 1523 is low when the clock transition arrives there. This results in $\overline{Q}$ being high, so that flip-flop 1524 is not reset, and its output goes high when the D1-delayed clock edge arrives. When flip-flop 1524 Q goes high, the current sink 1525 is connected to the capacitor $C_{int}$, pulling $C_{int}$ lower and increasing bypass conductance. Otherwise the current flowing through sink 1525 is supplied directly from supply voltage $V_{dd}$ and does not affect the bypass conductance.

The current sense output is also directed to a transconductance amplifier 1505, the output of which is integrated to produce the control response Res_Ctl. Note that in addition to the various alternative approaches that may be employed to sense the average output current, a correlate of the current may instead be used for negative current control. When the inductor current becomes negative on average, as will be the case for high bypass conductance, the integrator will cause Res_Ctl to rise. Res_Ctl in turn is directed to a controlled voltage source 1506, and when positive acts to decrease the bias voltage available for turning on SW1, thus reducing its conductance so as to minimize reverse current and consequent power dissipation, while still maintaining sufficient current through the buck regulator to regulate the output voltage. In an alternative embodiment, Res_Ctl is directed into an analog-to-digital converter and the result used to control activation of varying numbers of segments of SW1, allowing its conductance to be controllably reduced when appropriate without going to 0. Partitioning of SW1 and SW2 into a number of individually-controlled segments is common in the art in order to maximize converter efficiency under varying load conditions; when such partitioning is employed, reducing active segments in order to minimize negative current flow becomes an additional case to add to the pre-existing provisions for controlling segment activity.

Figure 19:
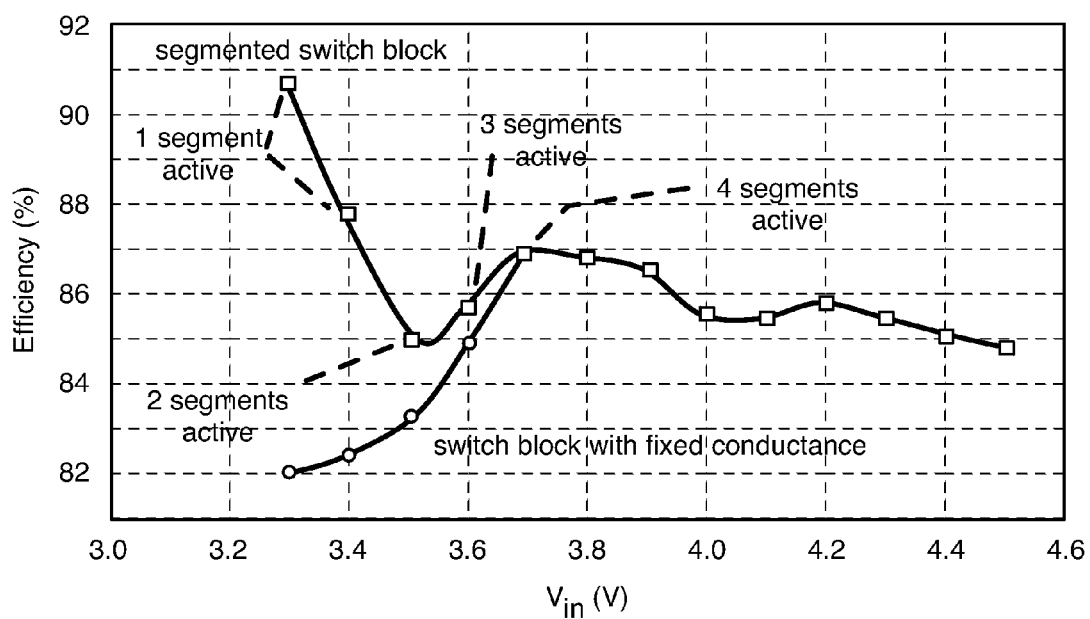
FIG. 19 is a plot that shows an example of measured efficiency of a converter with bypass active as a function of input voltage with different numbers of segment active, at a fixed output voltage.

Measured efficiency as a function of input voltage at a fixed output voltage is depicted in FIG. 19. FIG. 19 compares an embodiment in which the SW1 conductance is held constant as the bypass current changes (corresponding to FIG. 14) with a second embodiment in which SW1 is partitioned into four segments, so that the conductance of SW1 can be reduced by reducing the number of segments of the switch that are powered, corresponding to FIG. 17. It is apparent that greatly improved efficiency can be obtained at low input voltage (high conversion ratio) when the conductance of the switching devices can be reduced to minimize negative current flowing through the output inductor.

Figure 20:
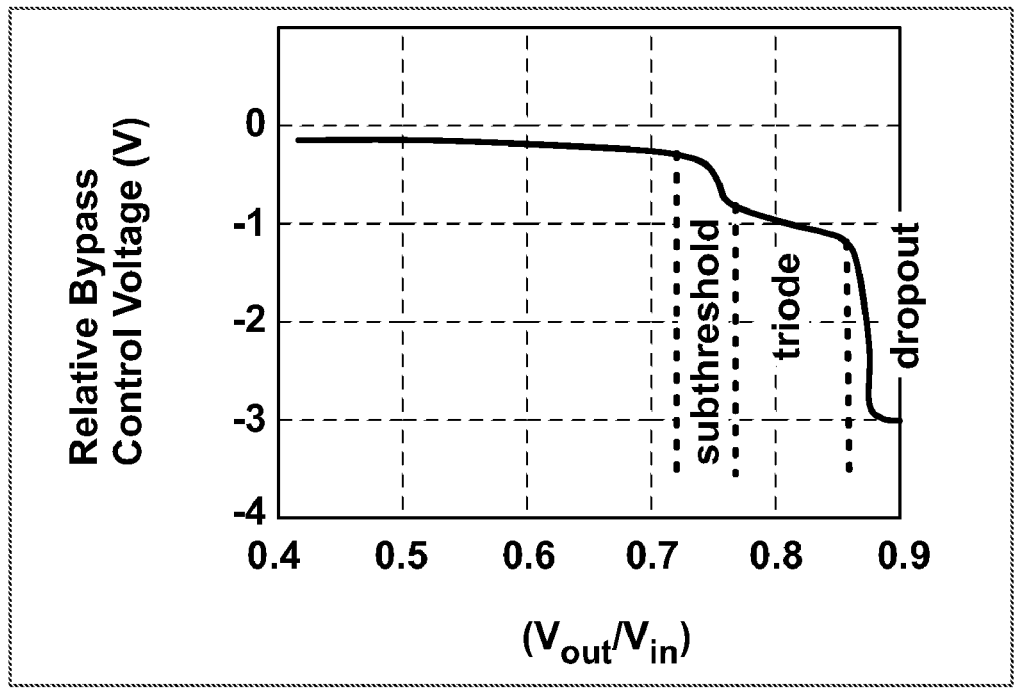
FIG. 20 is a plot showing an example of measured bypass control voltage as a function of conversion ratio.

Measured control voltage as a function of conversion ratio is shown in FIG. 20. The diagram shows that three differing behavioral regions are distinguishable; based on simulations, these are assigned, as shown in the figure, to subthreshold operation of $Q_{byp}$, normal triode operation, and dropout. The least stable region of operation is the transition region between subthreshold and triode operation, where the control voltage changes rapidly with conversion ratio. If the application may require operation in this region, the bypass control loop must be designed to ensure stability there, which may require a relatively conservative design with slow transient response. More aggressive control loop choices can be made if the application requirements permit the bypass element to remain in the triode region.

Figure 21:
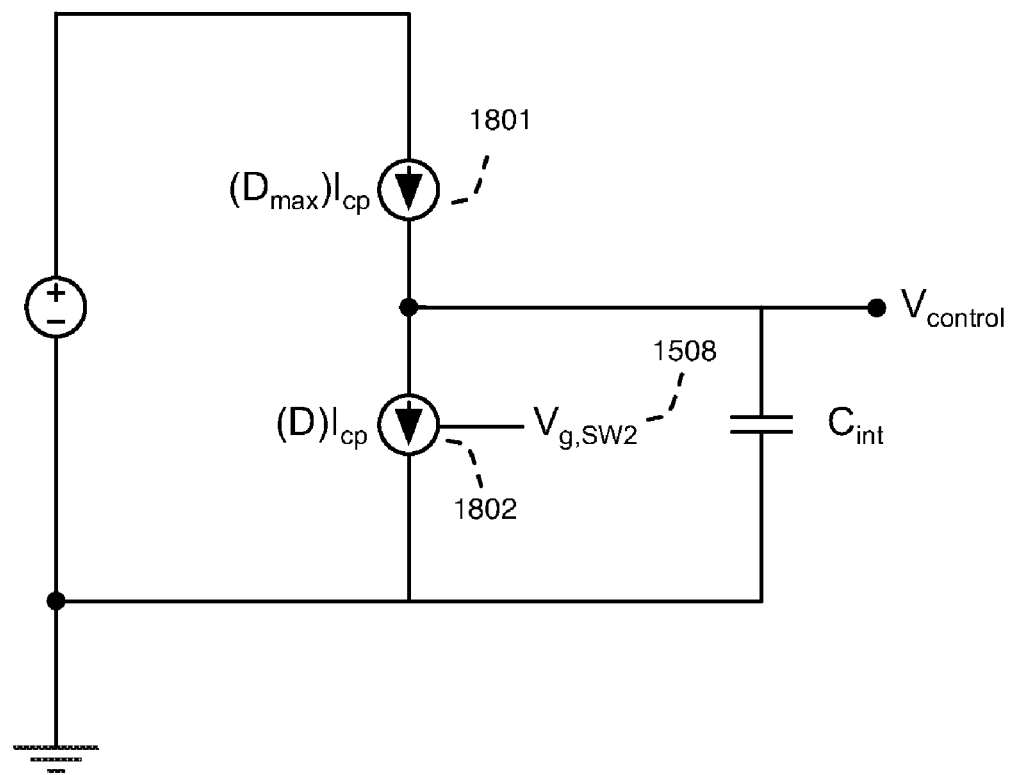
FIG. 21 shows an example of an implementation of a bypass control voltage generation circuit using a charge pump.

An alternative embodiment of the bypass controller 1501 is shown in FIG. 21. In this embodiment, the control voltage is generated using a charge pump rather than a low-pass filter and transconductor. The circuit consists of a fixed current source 1801 providing a current $(D_{max})I_{cp}$, and a switched current source 1802 providing a current $I_{cp}$, which is switched on only when SW1 is on, using the gate voltage 1508 from switch SW1 as its control. (In an embodiment, this switched current source may be implemented using a fixed current source with switch FETs to direct its input to either the integrating capacitor or to the supply, similar to that shown in block 1502.) Since the second current source 1802 is on for the same times that SW1 is on, the average current is $(D)I_{cp}$. When D exceeds $D_{max}$, the current source 1802 draws net current from the node $V_{control}$, and the voltage across the capacitor $C_{int}$ falls, turning on the bypass transistor $Q_{byp}$ when the threshold voltage of $Q_{byp}$ is reached.

Although specific embodiments have been described and illustrated, the embodiments are not to be limited to the specific forms or arrangements of parts so described and illustrated.

What is claimed:

1. A method of controlling a bypass resistance of a voltage regulator, comprising:
    generating a regulated output voltage based upon a switching voltage;
    generating the switching voltage through controlled closing and opening of a series switch element and a shunt switch element, the series switch element and the shunt switch element being connected between voltages based on an input voltage;
    controlling a duty cycle of the switching voltage by sensing and feeding back the regulated output voltage;
    controlling the bypass resistance based on an integration of a difference between the duty cycle and a maximum duty cycle.

2. The method of claim 1, wherein the bypass resistance couples the input voltage to the regulated output voltage.

3. The method of claim 1, wherein the bypass resistance is controllably turned on if a parameter related to the duty cycle is sensed to be above a first threshold.

4. The method of claim 1, wherein the bypass resistance is controllably turned off if a parameter related to the duty cycle is sensed to be below a second threshold.

5. The method of claim 1, wherein the control of the bypass resistance comprises frequency detection of the switching voltage.

6. The method of claim 1, wherein a frequency of the switching voltage is substantially maintained while controllably adjusting the bypass resistance.

7. A method of controlling a bypass element of a voltage regulator, comprising:
    generating a regulated output voltage based upon a switching voltage;
    generating a switching voltage through controlled closing and opening of a series switch element and a shunt switch element, the series switch element and the shunt switch element being connected between voltages based on an input voltage;
    simultaneously controlling a duty cycle of the switching voltage, and a conductance of the bypass element,
    wherein the simultaneous control comprises a pulse-width modulation loop and a bypass control loop, wherein the pulse-width modulation loop determines the duty cycle based on the output voltage, and the bypass control loop determines the conductance of the bypass element based on an integration of a difference between the duty cycle and a maximum duty cycle.

8. The method of claim 7, wherein the bypass element couples the input voltage to the regulated output voltage.

9. The method of claim 7, wherein the bypass element is controllably turned on if a parameter related to the duty cycle is sensed to be above a first threshold.

10. The method of claim 7, wherein the bypass element is controllably turned off if a parameter related to the duty cycle is sensed to be below a second threshold.

11. The method of claim 7, wherein the control of the bypass element comprises frequency detection of the switching voltage.

12. The method of claim 7, wherein a frequency of the switching voltage is substantially maintained while controllably adjusting the bypass element.

13. A method of controlling a bypass resistance of a voltage regulator, comprising:
    generating a regulated output voltage based upon a switching voltage;
    generating the switching voltage through controlled closing and opening of a series switch element and a shunt switch element, the series switch element and the shunt switch element being connected between voltages based on an input voltage;

providing a control of a duty cycle of the switching voltage by sensing and feeding back the regulated output voltage with a pulse-width modulation loop;

controlling the bypass resistance based on a parameter related to the duty cycle with a bypass control loop, wherein a response time of the pulse-width modulation loop is faster than a response time of the bypass control loop.

14. The method of claim 13, wherein the bypass resistance couples the input voltage to the regulated output voltage.

15. The method of claim 13, wherein the bypass resistance is controllably turned on if a parameter related to the duty cycle is sensed to be above a first threshold.

16. The method of claim 13, wherein the bypass resistance is controllably turned off if a parameter related to the duty cycle is sensed to be below a second threshold.

17. The method of claim 13, wherein the control of the bypass resistance comprises frequency detection of the switching voltage.

18. The method of claim 13, wherein a frequency of the switching voltage is substantially maintained while controllably adjusting the bypass resistance.

19. A voltage regulator, comprising:
a series switch element and a shunt switch element connected between voltages based on an input voltage;
means for generating a switching voltage through controlled closing and opening of the series switch element and the shunt switch element;
means for generating a regulated output voltage based upon a switching voltage;
a duty cycle controller for controlling a duty cycle of the switching voltage by sensing and feeding back the regulated output voltage;
a bypass resistance coupled between the input voltage and the regulated output voltage; and
means for controlling the bypass resistance based on an integration of a difference between the duty cycle and a maximum duty cycle.

* * * * *